US007969949B2

(12) United States Patent
Liu et al.

(10) Patent No.: US 7,969,949 B2
(45) Date of Patent: Jun. 28, 2011

(54) METHOD AND BASE STATION FOR BANDWIDTH ALLOCATION IN WIRELESS SINGLE-HOP SELF-BACKHAUL NETWORKS

(75) Inventors: Erwu Liu, Shanghai (CN); Jiang Qi, Shanghai (CN); Xiaobing Leng, Shanghai (CN); Jimin Liu, Shanghai (CN)

(73) Assignee: Alcatel Lucent, Paris (FR)

( * ) Notice: Subject to any disclaimer, the term of this patent is extended or adjusted under 35 U.S.C. 154(b) by 847 days.

(21) Appl. No.: 11/558,055

(22) Filed: Nov. 9, 2006

(65) Prior Publication Data

US 2007/0110004 A1 May 17, 2007

(30) Foreign Application Priority Data

Nov. 11, 2005 (CN) .......................... 2005 1 0110322

(51) Int. Cl.
*H04L 5/14* (2006.01)

(52) U.S. Cl. ...... 370/337; 455/11.1; 455/41.2; 370/315; 370/316; 370/327; 370/328; 370/329

(58) Field of Classification Search .......................... None
See application file for complete search history.

(56) References Cited

U.S. PATENT DOCUMENTS

| 5,974,325 | A | 10/1999 | Kotzin et al. | |
|---|---|---|---|---|
| 6,016,311 | A | 1/2000 | Gilbert et al. | |
| 6,459,687 | B1 * | 10/2002 | Bourlas et al. | 370/328 |
| 6,925,068 | B1 * | 8/2005 | Stanwood et al. | 370/329 |
| 7,466,985 | B1 * | 12/2008 | Handforth et al. | 455/454 |
| 2002/0072375 | A1 | 6/2002 | Huslig | |
| 2004/0062214 | A1 | 4/2004 | Schnack et al. | |
| 2005/0048914 | A1 | 3/2005 | Satori et al. | |

FOREIGN PATENT DOCUMENTS

| CN | 1282493 A | 1/2001 |
|---|---|---|
| WO | WO 02/080483 A | 10/2002 |

OTHER PUBLICATIONS

Masahito ASA and David T. Chen, et al., Concepts for 802.16-based Mobile Multi-hop Relay Networking, Jul. 19, 2005.
eMGW Solutions, Enabling Operators to Provide Cost Effective Voice Services to Sparsely Populated Rural Areas, pp. 1-7, Alvarion, Copyright 2005.
U.S. Appl. No. 11/558,189, filed Nov. 9, 2006, titled Self-Backhaul Method and Apparatus in Wireless Communication Networks.
U.S. Appl. No. 11/558,201, filed Nov. 9, 2006, titled Method and Apparatus for Implementing Relay.
Gambiroza V., et al.: "End -to-End Performance and Fairness in Multihop Wireless Backhaul Networks," Sep. 26, 2004, Proceedings of the 10th Annual International Conference on Mobile Computing and Networking, Mobicom 2004, Philadelphia, PA, Sep. 26-Oct. 1, 2004, Annual International Conference on Mobile Computing and Networking, New York, NY, ACM, US, pp. 2, XP001235039.
Tzu-Jane Tsai, et al.: "IEEE 802.11 Mac Protocol over Wireless Mesh Networks: Problems and Perspectives" Mar. 25, 2005, Advanced Information Networking and Applications, 2005, 19th International Conference on Taipei, Taiwan Mar. 25-30, 2005, Piscataway, NJ, USA, IEEE, pp. 60-63, XP010789968.

* cited by examiner

*Primary Examiner* — Charles N Appiah
*Assistant Examiner* — Xiang Zhang
(74) *Attorney, Agent, or Firm* — Fay Sharpe LLP

(57) ABSTRACT

The present invention discloses a method and a base station for allocating bandwidth for subscriber stations and a backhaul station through taking into joint consideration uplink and down bandwidth requests from respective subscriber stations in a wireless single-hop self-backhaul network. Upon receipt of information on bandwidth requests from the subscriber stations, the base station takes uplink and downlink bandwidth requests into joint consideration, allocates bandwidth for the subscriber stations and the backhaul station, and then notifies the subscriber stations and the backhaul station. Since bandwidth allocation is no longer based on uplink and downlink resources separately, a relatively high system bandwidth utilization ratio can be achieved and uplink and downlink bandwidth fairness for asymmetric traffic be ensured even if the network is overloaded.

6 Claims, 8 Drawing Sheets

METHOD AND BASE STATION FOR BANDWIDTH ALLOCATION IN WIRELESS SINGLE-HOP SELF-BACKHAUL NETWORKS

CROSS-REFERENCE TO RELATED APPLICATION(S)

This application is based on the Chinese Patent Application No. 200510110322.2 filed on Nov. 11, 2005, the disclosure of which is hereby incorporated by reference.

FIELD OF THE INVENTION

The present invention relates to wireless communication networks, and particularly to a method and base station for bandwidth allocation in wireless self-backhaul networks (especially wireless single-hop self-backhaul networks).

BACKGROUND OF THE INVENTION

In a general point-to-multipoint (P2MP) wireless communications network, such as a cellular network (as shown in FIG. 1), subscriber stations (SS) access a base station by sharing wireless links, and the base station broadcasts information to every subscriber station through the wireless links.

In the prior art, bandwidth allocation methods for general cellular networks are all based on the following supposition: bandwidth allocation for uplink traffic is independent of bandwidth allocation for downlink traffic. This supposition is reasonable to the above cellular networks, such as 802.16 networks or UMTS/W-CDMA networks. Since uplink traffic resources do not have a direct bearing on downlink traffic resources in general cellular networks, uplink bandwidth allocation and downlink bandwidth allocation are performed on the basis of uplink traffic resources and downlink traffic resources respectively and independently.

However, the traditional allocation method, namely independent allocation of uplink and downlink bandwidth, does not apply to wireless single-hop self-backhaul networks.

FIG. 2 shows a wireless single-hop self-backhaul network. The network comprises a base station (BS), a plurality of subscriber stations (SS) and a backhaul station (BHS). The base station (BS) and the plurality of subscriber stations form a wireless cellular network in a traditional sense, the base station is connected with each of the subscriber stations and the backhaul station via wireless links, and BHS accesses the Internet through a wired link. Wherein, wireless self backhaul means that in the wireless communication network, the base station transmits backhaul transactions with the backhaul station through its own radio resources (frequency, sub-band, slot, etc.).

Apparently, the wireless self-backhaul network differs from the traditional cellular network in that the base station does not access the Internet directly through a wired link any more, but it accesses the Internet through a wireless link provided by the backhaul station as its subscriber stations. Therefore, the backhaul station not only provides a wireless link for BS to access the Internet but also receives radio resources allocated by BS as a subscriber station of BS.

This importantly difference makes the traditional bandwidth allocation method unsuitable for wireless single-hop self-backhaul networks. Main problems are as follows: when the traditional bandwidth allocation method is applied to the network, if a sum of uplink and downlink traffic bandwidth exceeds a given threshold (i.e. network overload), the system bandwidth utilization ratio will decrease sharply with the increase in network overload; meanwhile, bandwidth fairness of uplink and downlink traffic for asymmetric service will be utterly destroyed.

Therefore, we need a new bandwidth allocation method for wireless self-backhaul networks in order to solve the above problems, so that a high bandwidth utilization ratio can be achieved and uplink and downlink bandwidth fairness for asymmetric service can be ensured.

SUMMARY OF THE INVENTION

To this end, the present invention proposes a bandwidth allocation scheme in a wireless self-backhaul network (especially a wireless single-hop self-backhaul network), which allocates bandwidth for subscriber stations and backhaul station after taking into joint consideration uplink and downlink bandwidth requests from subscriber stations, so that a relatively high bandwidth utilization ratio and ideal fairness for uplink and downlink bandwidth can be ensured even if the wireless single-hop self-backhaul network is overloaded.

According to the first aspect of the present invention, a method for bandwidth allocation in a base station of a wireless communication network that further comprises a plurality of subscriber stations and a backhaul station is proposed, comprising the steps of: a) receiving uplink and downlink bandwidth allocation request messages from said subscriber stations; b) allocating bandwidth for said subscriber stations through joint processing on uplink and downlink bandwidth requests of said subscriber stations, to obtain uplink and downlink bandwidth allocation result of each of said subscriber stations; and c) notifying the corresponding subscriber station of said uplink and downlink bandwidth allocation result of each of said subscriber stations.

According to the second aspect of the present invention, a base station for bandwidth allocation in the wireless communication network is proposed, comprising:
a receiving means for receiving uplink and downlink bandwidth allocation request messages from said subscriber stations; a bandwidth allocation processing means for allocating bandwidth for said subscriber stations through joint processing on uplink and downlink bandwidth requests of said subscriber stations; a sending means for notifying the corresponding subscriber station of bandwidth allocation result of each of said subscriber stations.

In the present invention, since joint bandwidth allocation is used, i.e. uplink and downlink bandwidth requests of the subscriber stations are taken into joint consideration, the problems which the wireless self-backhaul network is confronted with when adopting the traditional bandwidth allocation method and which will occur during network overload is solved, i.e. the system bandwidth utilization ratio is very low and fairness of uplink and downlink bandwidth for asymmetric traffic is destroyed.

DETAILED DESCRIPTION OF PREFERRED EMBODIMENTS

Referring to the accompanying drawings, a detailed description will be given to the present invention in terms of embodiments. It should be understood that the present invention is not limited to the embodiments.

Figure 3:
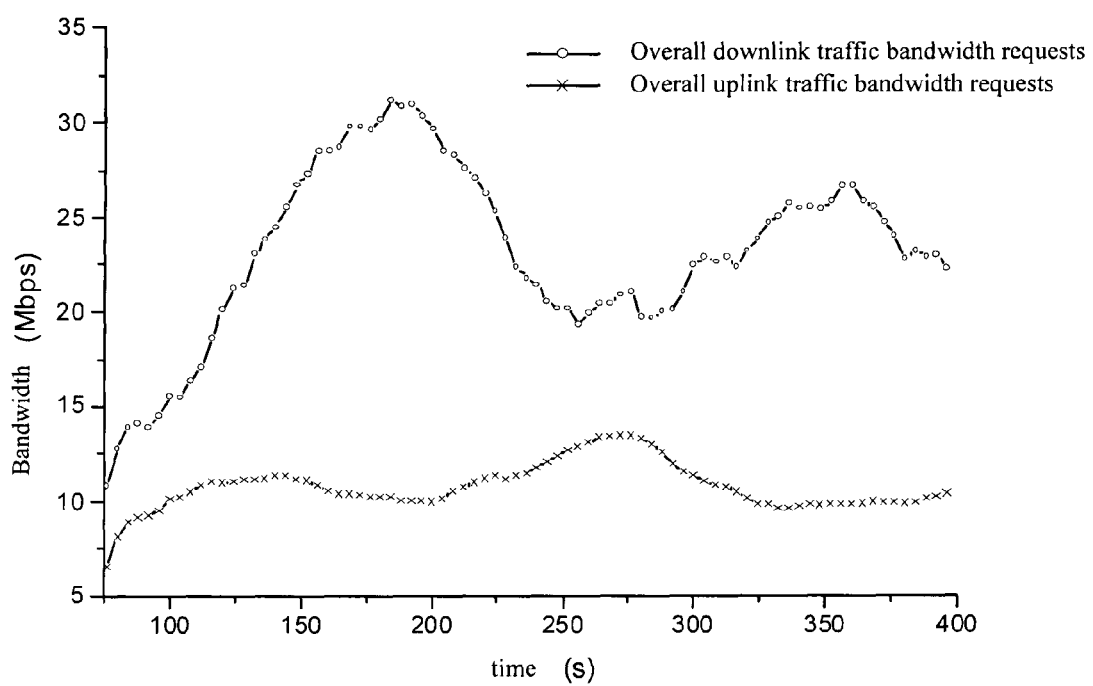
FIG. 3 is a schematic view of a bandwidth request from a subscriber station in the wireless single-hop self-backhaul network according to an embodiment of the present invention.

FIG. 3 is a schematic view of a bandwidth request in the wireless single-hop self-backhaul network according to an embodiment of the present invention. In the present embodiment, the service configuration is as follows: in a cellular network there are two video conference services and forty VoIP speech services, and other subscriber services include four common services, namely FTTP, HTTP, database access and Email.

Figure 4:
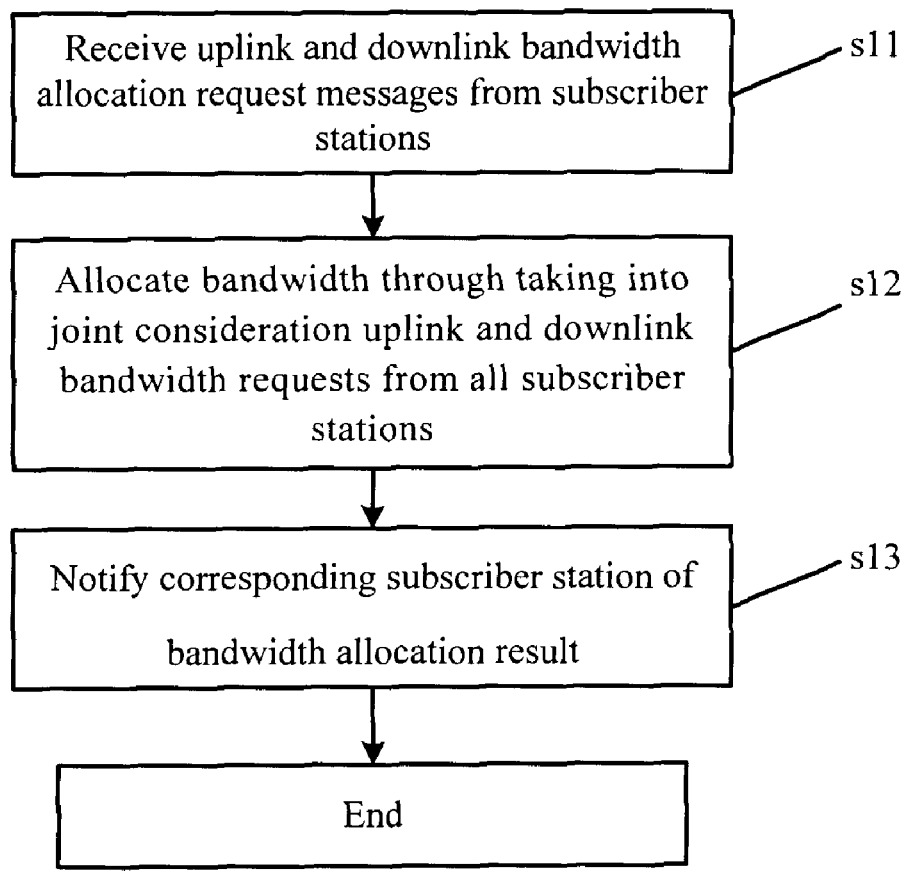
FIG. 4 is a flowchart of a method for bandwidth allocation in the wireless single-hop self-backhaul network according to an embodiment of the present invention.

FIG. 4 is a flowchart of a method for bandwidth allocation in a base station of a wireless communication network according to an embodiment of the present invention, wherein said wireless communication network further comprises a plurality of subscriber stations and a backhaul station.

As shown in FIG. 4, uplink and downlink bandwidth allocation request messages from the subscriber stations is received in step S11, wherein the subscriber station's bandwidth request message may be transferred as control message.

In step S12, bandwidth is allocated to said each of the subscriber stations through joint processing on uplink and downlink bandwidth requests of said subscriber stations, to obtain uplink and downlink bandwidth allocation result of each of the subscriber stations.

Subsequently, the corresponding subscriber station is notified of said uplink and down bandwidth allocation result of each of the subscriber stations in step S13.

Figure 1:
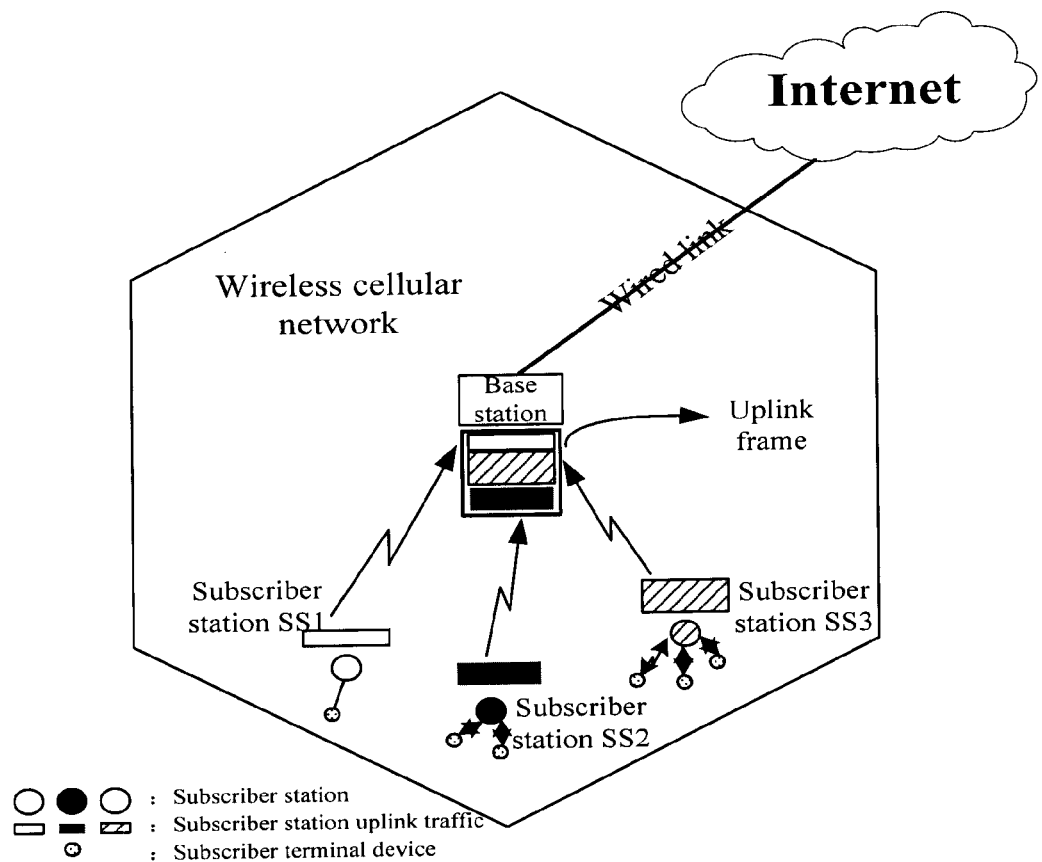
FIG. 1 is a schematic view of a general cellular network.
Figure 2:
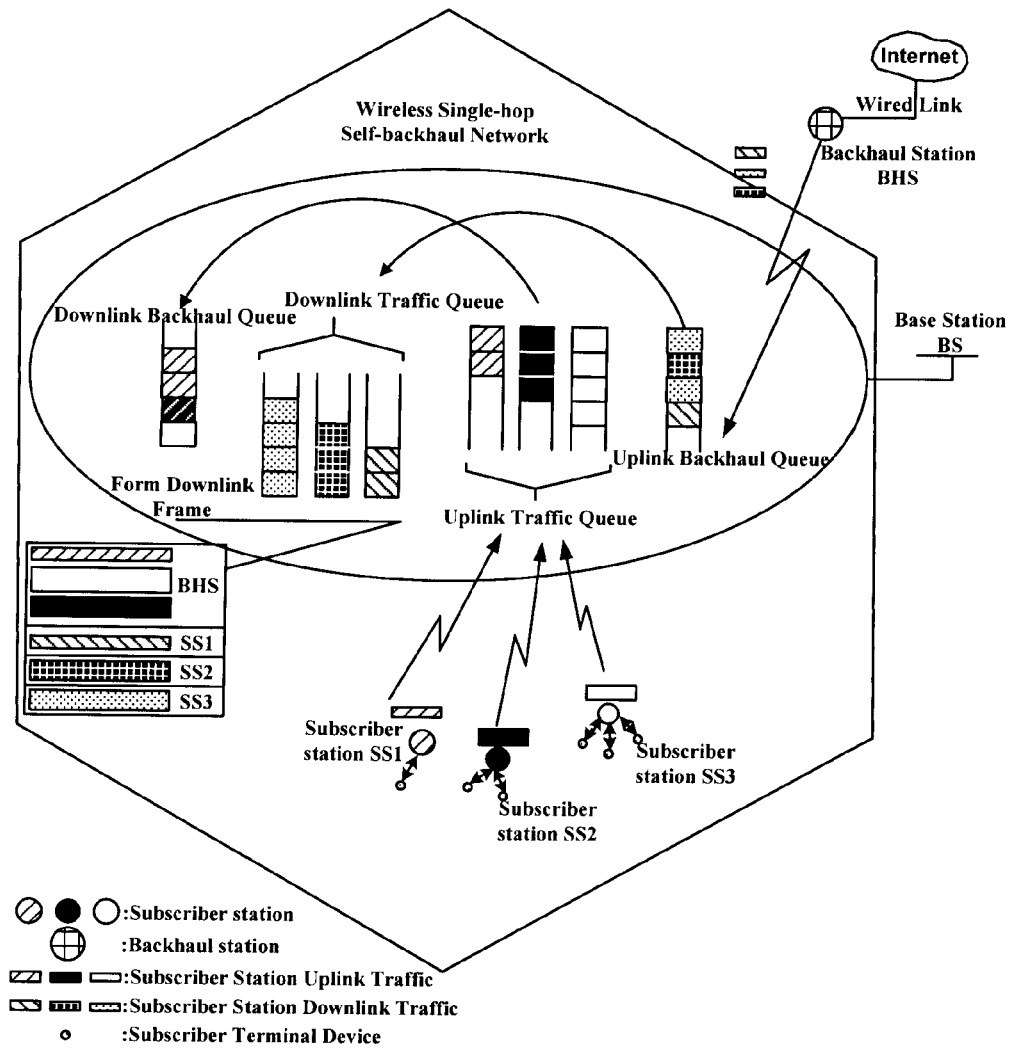
FIG. 2 is a schematic view of a wireless single-hop self-backhaul network.

When the wireless communication network may be a wireless single-hop self-backhaul network, a wireless backhaul station 3 (as shown in FIG. 2) is further comprised, wherein a wireless base station 2 transmits backhaul traffic with the wireless backhaul station by using its own radio resources. Wireless backhaul station 3 not only provides a wireless link for the base station to access a core network but also receives as a subscriber station of the base station radio resources allocated by the base station. However, generally, wireless backhaul station 3 does not request bandwidth allocation.

In an embodiment, after a base station 1 receives uplink and downlink bandwidth request information from each of the subscriber stations, the bandwidth allocation method of joint processing on bandwidth requests may allocate bandwidth through the following equations:

$$SS_{UGi} = \frac{SS_{Ui}}{\sum_{i=1}^{N}(SS_{Ui}+SS_{Di})} \times \min\left\{BS_U, \sum_{i=1}^{N}(SS_{Ui}+SS_{Di})\right\} \quad (1)$$

$$BH_{UG} = BS_U - \sum_{i=1}^{N} S_{UGi} \quad (2)$$

$$SS_{DGi} = \frac{SS_{Di}}{\sum_{i=1}^{N}(SS_{Ui}+SS_{Di})} \times \min\left\{BS_D, \sum_{i=1}^{N}(SS_{Ui}+SS_{Di})\right\} \quad (3)$$

$$BH_{DG} = BS_D - \sum_{i=1}^{N} S_{DGi} \quad (4)$$

Suppose there are a total of N subscriber stations, $BS_U$ is the base station's overall uplink bandwidth, $BS_D$ is the base station's overall downlink bandwidth, $SS_{Ui}, SS_{Di}$ is uplink and downlink bandwidth which the $i^{th}$ subscriber station requests, $SS_{UGi}, SS_{DGi}$ is uplink and downlink bandwidth allocated to the $i^{th}$ subscriber station, and $BH_{UG}, BH_{DG}$ is uplink and downlink backhaul traffic bandwidth allocated to the backhaul station, and $1 \leq i \leq N$.

As seen from equations (1) to (4), the backhaul station does not send bandwidth allocation request information in the present embodiment.

Figure 5:
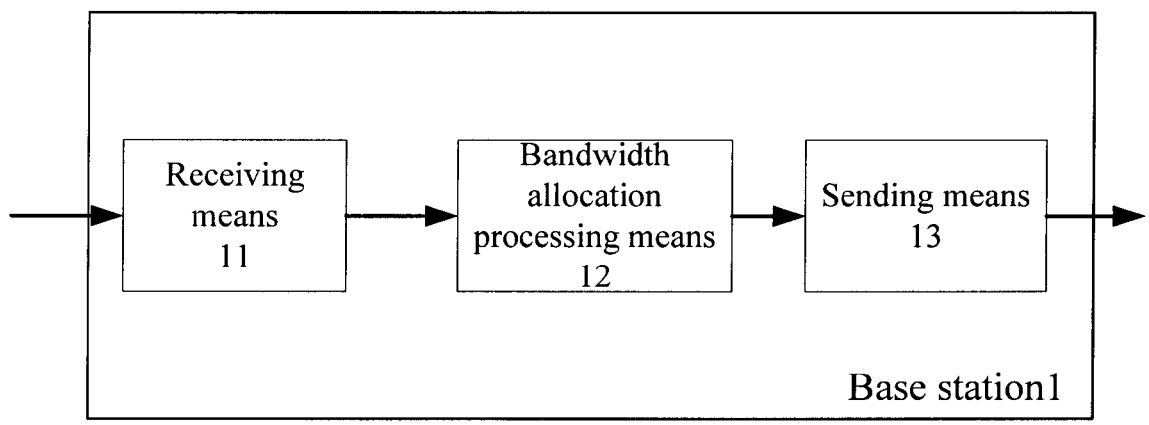
FIG. 5 is a schematic view of a base station for bandwidth allocation in the wireless single-hop self-backhaul network according to an embodiment of the present invention.

FIG. 5 shows a base station in the wireless communication network according to an embodiment of the present invention. As shown in FIG. 5, the base station comprises a receiving means 11, a bandwidth allocation processing means 12 and a sending means 13.

Wherein, receiving means 11 is used for receiving an uplink and downlink bandwidth allocation request message from said each of the subscriber stations.

Bandwidth allocation processing means 12 is used for allocating bandwidth for said each of the subscriber stations through joint processing on uplink and downlink bandwidth request from each of said subscriber stations.

Sending means 13 is used for notifying the corresponding subscriber station of a bandwidth allocation result of said each of the subscriber stations. Wherein, the bandwidth request message may be transferred as control message, so that it can be processed by using existing corresponding transmitting and receiving units in the wireless base station.

When the wireless communication network may be a wireless single-hop self-backhaul network, a wireless backhaul station 3 (as shown in FIG. 2) is further comprised, wherein a wireless base station 2 transmit backhaul traffic with the wireless backhaul station by using its own radio resources. Wireless backhaul station 3 not only provides a wireless link for the base station to access a core network but also receives as a subscriber station of the base station radio resources allocated by the base station. However, generally, wireless backhaul station 3 does not request bandwidth allocation.

Figure 6:
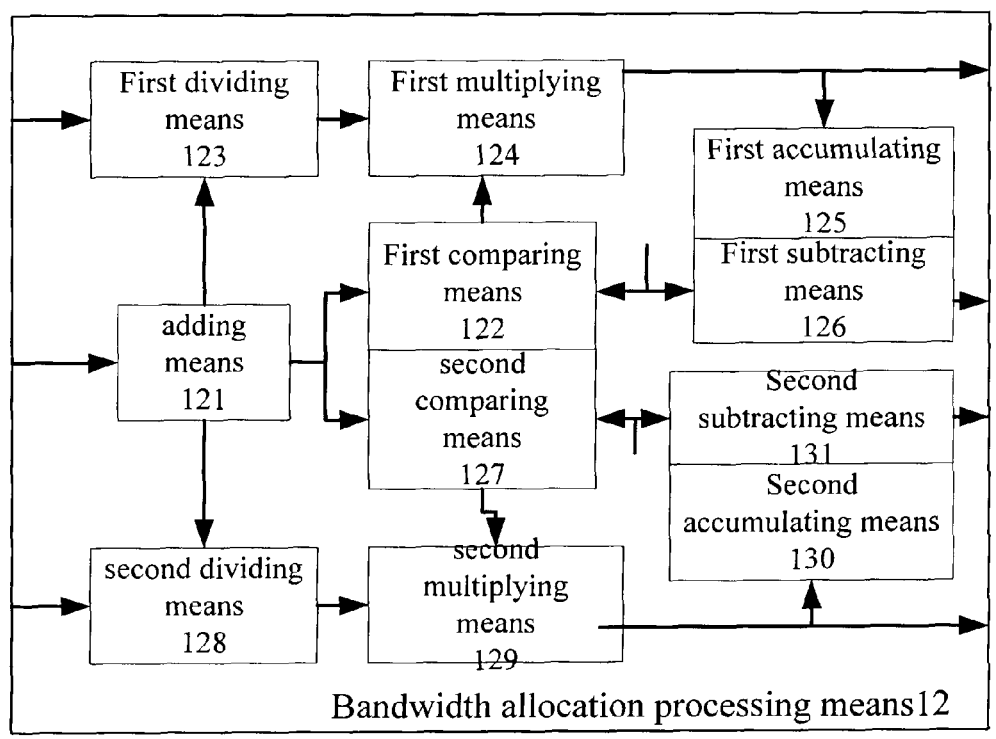
FIG. 6 shows a block diagram of a bandwidth allocation processing means 12 in a wireless self-backhaul network according to an embodiment of the present invention.

FIG. 6 shows the block diagram of bandwidth allocation processing means 12 in a wireless self-backhaul network according to an embodiment of the present invention. Wherein, bandwidth allocation processing means 12 performs joint processing on uplink and downlink bandwidth requests from all of the subscriber stations by using the above equations (1) to (4), to obtain an uplink and downlink bandwidth allocation result for each of the subscriber stations.

Figure 8:
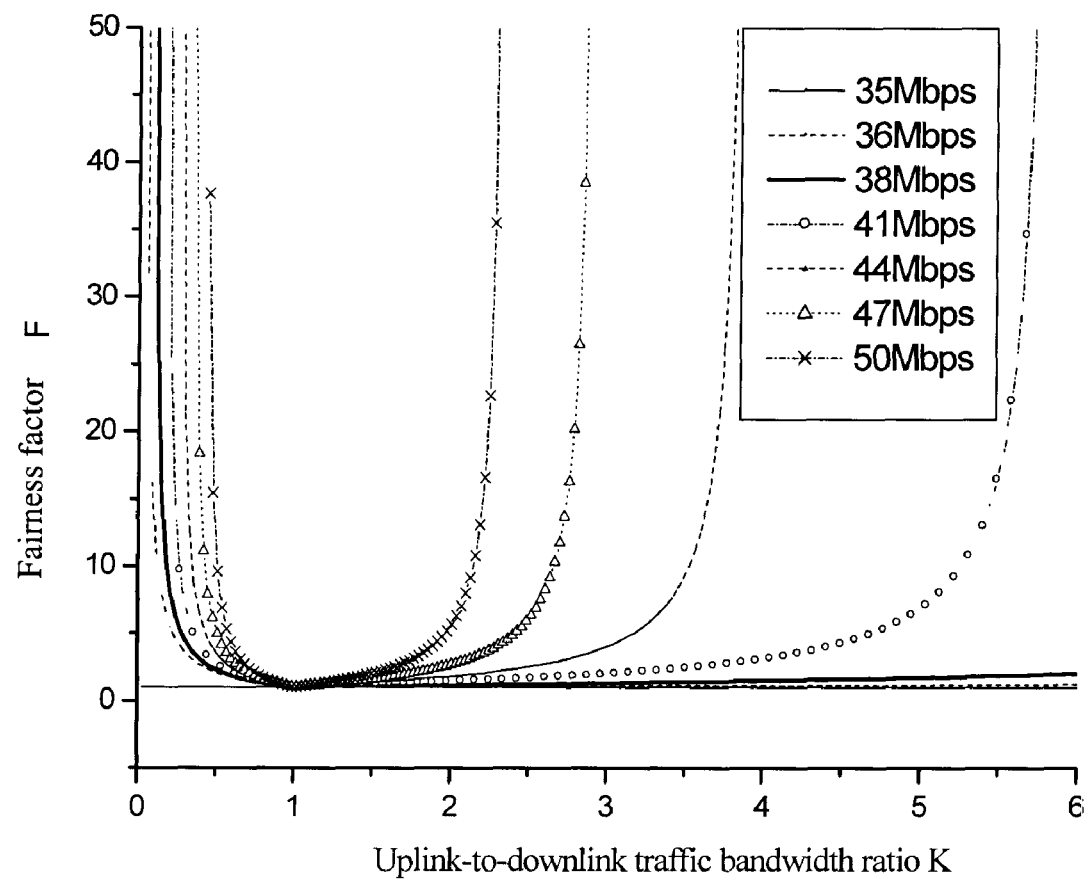
FIG. 8 shows the change situation for uplink and downlink bandwidth fairness in the wireless single-hop self-backhaul network after the adoption of the traditional bandwidth allocation method.

As shown in FIG. 8, bandwidth allocation processing means 12 comprises: adding means 121, first comparing means 122, first dividing means 123, first multiplying means 124, first accumulating means 125, first subtracting means 126, second comparing means 127, second dividing means 128, second multiplying means 129, second accumulating means 130, and second subtracting means 131.

Said adding means 121 is used for adding up uplink and downlink bandwidth requests of all of the subscriber stations, to obtain a sum of uplink and downlink bandwidth requests of all of the subscriber stations;

Said first comparing means 122 is used for comparing the base station's overall uplink bandwidth with the sum of uplink and downlink bandwidth requests of all of the subscriber stations, to obtain the minimum value between the base station's overall uplink bandwidth and the sum of uplink and downlink bandwidth requests of all of the subscriber stations;

Said first dividing means 123 is used for dividing uplink bandwidth request of each of the subscriber stations by said sum of uplink and downlink bandwidth request of all of the subscriber stations, to obtain a ratio of uplink bandwidth requests of each of the subscriber stations to the sum of uplink and downlink bandwidth requests of all of the subscriber stations;

Said first multiplying means 124 is used for multiplying the ratio of uplink bandwidth requests of each of the subscriber stations to the sum of uplink and downlink bandwidth requests of all of the subscriber stations by the minimum value between the base station's overall uplink bandwidth and the sum of uplink and downlink bandwidth requests of all of the subscriber stations, to obtain the uplink bandwidth allocation result of said subscriber station;

Said second comparing means 127 is used for comparing the base station's overall downlink bandwidth with the sum of uplink and downlink bandwidth requests of all of the subscriber stations, to obtain the minimum value between the base station's overall downlink bandwidth with the sum of uplink and downlink bandwidth requests of all of the subscriber stations;

Said second dividing means 128 is used for dividing downlink bandwidth request of each of the subscriber stations by said sum of uplink and downlink bandwidth requests of all of the subscriber stations, to obtain a ratio of downlink bandwidth request of each of the subscriber stations to the sum of uplink and downlink bandwidth requests of all of the subscriber stations;

Said second multiplying means 129 is used for multiplying the ratio of downlink bandwidth requests of each of the subscriber stations to the sum of uplink and downlink bandwidth requests of all of the subscriber stations by the minimum value between the base station's overall downlink bandwidth and the sum of uplink and downlink bandwidth requests of all of the subscriber stations, to obtain the downlink bandwidth allocation result of said subscriber station;

Said first accumulating means 125 is used for accumulating uplink bandwidth allocated for all of the subscriber stations, to obtain a sum of uplink bandwidth allocated for all of the subscriber stations;

Said first subtracting means 126 is used for subtracting the sum of uplink bandwidth allocated for all of the subscriber stations from said base station's overall uplink bandwidth, to obtain the uplink bandwidth allocation result of said wireless backhaul station;

Said second accumulating means 130 is used for accumulating downlink bandwidth allocated for all of the subscriber stations, to obtain a sum of downlink bandwidth allocated for all of the subscriber stations;

Said second subtracting means 131 is used for subtracting the sum of downlink bandwidth allocated for all of the subscriber stations from said base station's overall downlink bandwidth, to obtain the downlink bandwidth allocation result of said wireless backhaul station;

Suppose that the downlink traffic overall bandwidth request is k times as large as the uplink traffic overall bandwidth request, i.e.

$$\sum_{i=1}^{N} S_{Di} = k \times \sum_{i=1}^{N} S_{Ui},$$

then equation (5) can be derived from equations (1) to (4):

$$k' = \frac{\sum_{i=1}^{N} S_{DGi}}{\sum_{i=1}^{N} S_{UGi}} \qquad (5)$$

$$= \frac{\sum_{i=1}^{N} S_{Di}}{\sum_{i=1}^{N} S_{Ui}} \times \frac{\min\left\{BS_D, \sum_{i=1}^{N}(SS_{Ui}+SS_{Di})\right\}}{\min\left\{BS_U, \sum_{i=1}^{N}(SS_{Ui}+SS_{Di})\right\}}$$

$$= k \times \frac{\min\left\{BS_D, \sum_{i=1}^{N}(SS_{Ui}+SS_{Di})\right\}}{\min\left\{BS_U, \sum_{i=1}^{N}(SS_{Ui}+SS_{Di})\right\}}$$

Suppose that the sum of uplink traffic bandwidth which all of the subscriber stations request is A, and that the sum of downlink traffic bandwidth which all of the subscriber stations request is B, then B=A×k. After bandwidth allocation, the sum of the allocated uplink traffic bandwidth is A', the sum of the allocated downlink traffic bandwidth is B', and B'=A'×k'. It is defined the parameter for measuring fairness F=k'/k. After bandwidth allocation, if F=1, then it means that the uplink and downlink traffic of the subscriber station achieves hundred-percent fairness after bandwidth allocation; if F deviates from 1, it means that the uplink and downlink traffic of the subscriber stations does not achieve hundred-percent fairness after bandwidth allocation. The more F deviates from 1, the worse the fairness of the uplink and downlink traffic is after allocation.

It can be derived from equation (5) that $$\begin{cases} \text{when } \sum_{i=1}^{N}(SS_{Ui}+SS_{Di}) \leq \min\{BS_D, BS_U\} F = 1 \\ \text{when } BS_D = BS_U \text{ and } \sum_{i=1}^{N}(SS_{Ui}+SS_{Di}) \geq BS_D, F = 1 \\ \text{others}, \quad F \neq 1 \end{cases} \qquad (6)$$

It can be seen from equation (6) that in the present embodiment, in order to achieve a high system bandwidth utilization ratio while ensuring fairness of the uplink and downlink traffic bandwidth during network overload, the base station must allocate the system's uplink and downlink bandwidth in a ratio of 0.5:0.5, i.e. $BS_D=BS_U=BS_{ALL}/2$, in which $BS_{ALL}$ is the overall bandwidth of the cellular network.

Figure 7:
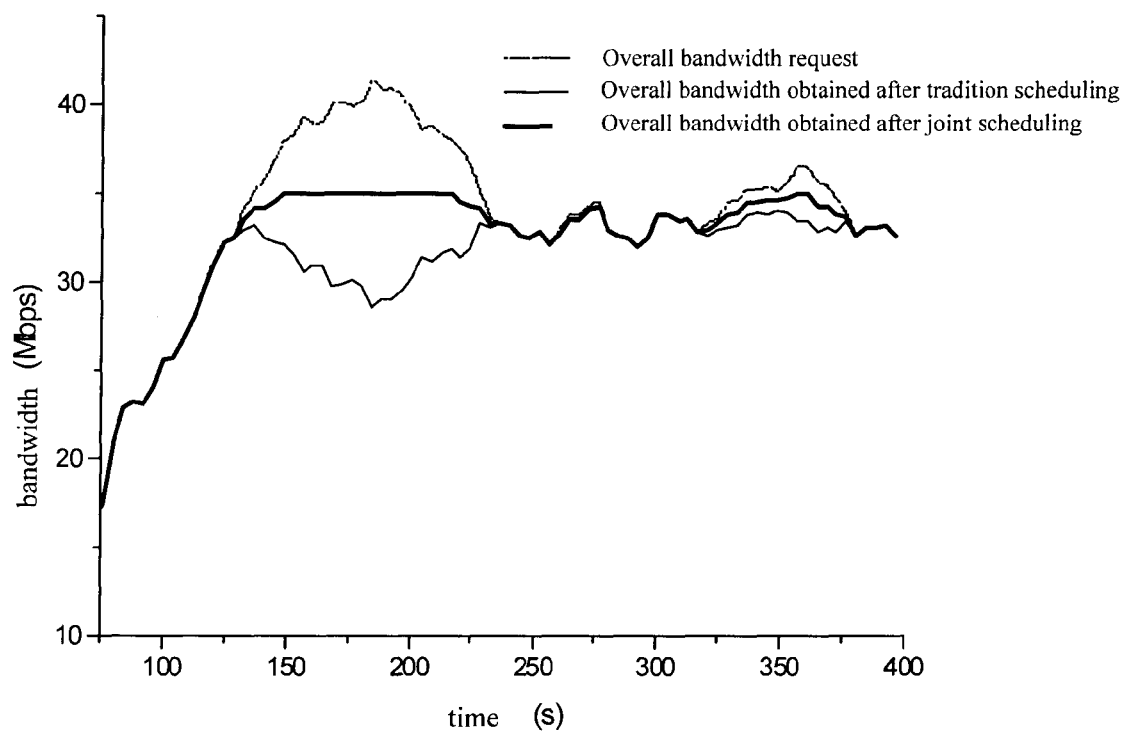
FIG. 7 is a schematic view of the bandwidth allocation situation for subscriber stations and a backhaul station by the base station in the wireless single-hop self-backhaul network according to an embodiment of the present invention.

FIG. 7 shows the bandwidth allocation situation in the wireless single-hop self-backhaul network after the adoption of the traditional bandwidth allocation method and the adoption of the bandwidth allocation method according to the present invention. It can be seen from FIG. 7 that after bandwidth requests exceed a threshold, with the traditional bandwidth allocation method, the overall bandwidth allocated for the system decreases with the increase in overall bandwidth requests, and as bandwidth requests reach the peak, the overall bandwidth allocated reaches the bottom at the same time, and then, as overall bandwidth requests decrease, the overall bandwidth allocated begins to increase. Around the threshold, the overall bandwidth allocated and overall bandwidth requests are always on both sides of the threshold. That is, the bandwidth utilization ratio decreases with the increase in overload. Due to the particularity of wireless self backhaul, when overall bandwidth requests exceed a certain threshold, corresponding uplink bandwidth requests increase with the increase in overall bandwidth requests. Thus, the base station is required to allocate more bandwidth for uplink traffic. Since the uplink bandwidth capacity is equal to a sum of the bandwidth allocated for uplink traffic and the uplink bandwidth allocated for wireless self-backhaul link, the uplink bandwidth which wireless self-backhaul link obtains will decrease correspondingly. Since the uplink bandwidth of self-backhaul link is downlink bandwidth used for transmitting all traffic, that means the downlink bandwidth allocated for traffic will decrease. In short, when the uplink bandwidth allocated for traffic increases, the downlink bandwidth allocated for traffic will decrease, and vice versa. Meanwhile, uplink and downlink bandwidth for traffic is asymmetric. Then, these two factors result in that after bandwidth requests exceed a threshold, the overall bandwidth which the base station allocates for subscribers will decrease with the increase in bandwidth requests.

FIG. 7 further shows the bandwidth situation allocated for the subscriber station and the backhaul station by the base station in the wireless single-hop self-backhaul network after the adoption of the bandwidth allocation method according to the present invention. Apparently, the overall bandwidth allocated for the system by using the bandwidth allocation method according to the present invention is always larger than the overall bandwidth allocated for the system by using the traditional bandwidth allocation method. Moreover, due to the particularity of the wireless single-hop self-backhaul network (that is, the backhaul station not only serves as a subscriber station of the base station, for which the base station allocates radio resources, but also provides backhaul support for the subscriber stations), the system bandwidth utilization ratio can only reach a maximum of 50%, a limit of bandwidth utilization in such network environment.

As seen from FIG. 7, for the wireless self-backhaul network, the network performance with the bandwidth allocation method according to the present invention is basically the same as the one with the traditional bandwidth allocation method in the case that the network is not overloaded, whereas the system bandwidth utilization ratio with the above methods will greatly differ from each other in the case that the network is overloaded.

FIG. 8 shows a situation in which the fairness of uplink and downlink traffic bandwidth for asymmetric traffic of the subscriber station changes after the adoption of the traditional bandwidth allocation method and in different overload conditions of the wireless single-hop self-backhaul network according to an embodiment of the present invention. Apparently, the more the network is overloaded, the worse the fairness of uplink and downlink traffic bandwidth allocated for asymmetric traffic of the subscriber station deteriorates with the traditional bandwidth allocation scheme will be, and such deterioration becomes more and more serious with the increase in the asymmetry degree of uplink and downlink traffic bandwidth of the subscriber station. In the figure, through traditional bandwidth allocation, the ratio of uplink bandwidth to downlink bandwidth for traffic with the overall uplink and downlink bandwidth of 38 Mbps is allowed to be between 0.5 and 6.0 in order to keep the relative fairness of uplink and downlink traffic bandwidth. As for traffic with the overall uplink and downlink bandwidth of 50 Mbps, through traditional bandwidth allocation, the ratio of uplink bandwidth to downlink bandwidth for the asymmetric traffic is between 0.7 and 1.5 in order to keep the fairness. If the ratio is outside this range, the fairness of uplink and downlink bandwidth of the asymmetric traffic becomes impossible.

If the new bandwidth allocation method the present invention has proposed is used, it can be seen from equation (6) that for the wireless single-hop self-backhaul network, as long as the system's (i.e. base station) overall uplink bandwidth is equal to the overall downlink bandwidth thereof, it is possible to ensure hundred-percent fairness of uplink and downlink bandwidth for asymmetric traffic of the subscriber station even if the network is overloaded. That is, in relation to the change curve of the uplink-to-downlink bandwidth ratio, the fairness factor F is a straight line that is parallel to the horizontal axis, and the corresponding F value is constantly equal to 1.

As the embodiments of the present invention have been described above, it should be understood that the present invention is not limited to the above specific embodiments. Various modifications or alterations can be made by those skilled in the art without departing from the scope as defined by the appended claims.

What is claimed is:

1. A method for bandwidth allocation in a base station of a wireless communication network that further comprises a plurality of subscriber stations and a backhaul station, said wireless communication network being a wireless backhaul network comprising the steps of:
    a) receiving uplink and downlink bandwidth allocation request messages from said subscriber stations;
    b) allocating bandwidth for said respective subscriber stations through joint processing on uplink and downlink bandwidth requests of said respective subscriber stations, to obtain uplink and downlink bandwidth allocation result of each of said subscriber stations and obtaining the uplink bandwidth allocation result of said wireless backhaul station through subtracting the sum of uplink bandwidth allocated for all subscriber stations from said base station's overall uplink bandwidth; and obtaining the downlink bandwidth allocation result of said wireless backhaul station through subtracting the sum of downlink bandwidth allocated for all subscriber stations from said base station's overall downlink bandwidth; and
    c) notifying the corresponding subscriber station of said uplink and downlink bandwidth allocation result of each of said subscriber stations and notifying said wireless backhaul station of the uplink and downlink bandwidth allocation results of said wireless backhaul station.

2. The method according to claim 1, characterized in that step b) comprises:
    obtaining the uplink bandwidth allocation result of said subscriber station through multiplying the ratio of uplink bandwidth request of each subscriber station to the sum of uplink and downlink bandwidth requests of all subscriber stations by the minimum value between the base station's overall uplink bandwidth and the sum of uplink and downlink bandwidth requests of all subscriber stations.

3. The method according to claim 1 characterized in that step b) further comprises:
- allocating downlink bandwidth for said subscriber station through multiplying the ratio of downlink bandwidth request of each subscriber station to the sum of uplink and downlink bandwidth requests of all subscriber stations by the minimum value between the base station's overall downlink bandwidth and the sum of uplink and downlink bandwidth requests of all subscriber stations.

4. A base station for bandwidth allocation in a wireless communication network, said wireless communication network being a wireless backhaul network, wherein said base station transmits backhaul traffic with a wireless backhaul station by using its own radio resources, said base station comprising:
- a receiving means for receiving uplink and downlink bandwidth allocation request messages from said subscriber stations;
- a bandwidth allocation processing means for allocating bandwidth for said subscriber stations through joint processing on uplink and downlink bandwidth requests of said subscriber stations said bandwidth allocation processing means including a first accumulating means for accumulating uplink bandwidth allocated for all subscriber stations, to obtain the sum of uplink bandwidth allocated for all subscriber stations, a first subtracting means for subtracting the sum of uplink bandwidth allocated for all subscriber stations from said base station's overall uplink bandwidth, to obtain the uplink bandwidth allocation result of said wireless backhaul station; a second accumulating means for accumulating downlink bandwidth allocated for all subscriber stations, to obtain the sum of downlink bandwidth allocated for all subscriber stations; and a second subtracting means for subtracting the sum of downlink bandwidth allocated for all subscriber stations from said base station's overall downlink bandwidth, to obtain the downlink bandwidth allocation result of said wireless backhaul station; and
- a sending means for notifying the corresponding subscriber station of bandwidth allocation result of each of said subscriber stations and for notifying said wireless backhaul station of the uplink and downlink bandwidth allocation results of said wireless backhaul station.

5. The base station according to claim 4, characterized in that said bandwidth allocation processing means comprises:
- an adding means for adding up uplink and downlink bandwidth requests of all subscriber stations, to obtain the sum of uplink and downlink bandwidth requests of all subscriber stations;
- a first comparing means for comparing the base station's overall uplink bandwidth with the sum of uplink and downlink bandwidth request of all subscriber stations, to obtain the minimum value between the base station's overall uplink bandwidth and the sum of uplink and downlink bandwidth requests of all of the subscriber stations;
- a first dividing means for dividing uplink bandwidth request of each subscriber station by said sum of uplink and downlink bandwidth requests of all subscriber stations, to obtain the ratio of uplink bandwidth request of each subscriber station to the sum of uplink and downlink bandwidth requests of all subscriber stations; and
- a first multiplying means for multiplying the ratio of uplink bandwidth request of each subscriber station to the sum of uplink and downlink bandwidth requests of all subscriber stations by the minimum value between the base station's overall uplink bandwidth and the sum of uplink and downlink bandwidth requests of all subscriber stations, to obtain the uplink bandwidth allocation result of said subscriber station.

6. The base station according to claim 5, characterized in that said bandwidth allocation processing means further comprises:
- a second comparing means for comparing the base station's overall downlink bandwidth with the sum of uplink and downlink bandwidth requests of all subscriber stations, to obtain the minimum value between the base station's overall downlink bandwidth with the sum of uplink and downlink bandwidth requests of all subscriber stations;
- a second dividing means for dividing downlink bandwidth request of each subscriber station by said sum of uplink and downlink bandwidth requests of all subscriber stations, to obtain the ratio of downlink bandwidth request of each subscriber station to the sum of uplink and downlink bandwidth requests of all subscriber stations; and
- a second multiplying means for multiplying the ratio of downlink bandwidth request of each subscriber station to the sum of uplink and downlink bandwidth requests of all subscriber stations by the minimum value between the base station's overall downlink bandwidth and the sum of uplink and downlink bandwidth requests of all subscriber stations, to obtain the downlink bandwidth allocation result of said subscriber station.

* * * * *